United States Patent
Fujimoto et al.

(10) Patent No.: US 9,851,373 B2
(45) Date of Patent: Dec. 26, 2017

(54) VIBRATOR AND VIBRATING GYROSCOPE

(71) Applicant: Murata Manufacturing Co., Ltd., Nagaokakyo-shi, Kyoto-fu (JP)

(72) Inventors: Katsumi Fujimoto, Nagaokakyo (JP); Toshimaro Yoneda, Nagaokakyo (JP); Takuo Hada, Nagaokakyo (JP); Hideya Horiuchi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 207 days.

(21) Appl. No.: 14/100,100

(22) Filed: Dec. 9, 2013

(65) Prior Publication Data

US 2014/0090470 A1    Apr. 3, 2014

Related U.S. Application Data

(63) Continuation of application No. PCT/JP2012/066501, filed on Jun. 28, 2012.

(30) Foreign Application Priority Data

Jul. 4, 2011  (JP) .................................. 2011-148481

(51) Int. Cl.
  *G01C 19/56*  (2012.01)
  *G01C 19/5684*  (2012.01)

(52) U.S. Cl.
  CPC ............ *G01P 9/04* (2013.01); *G01C 19/5684* (2013.01)

(58) Field of Classification Search
  USPC ......................................... 73/504.12, 504.13
  See application file for complete search history.

(56) References Cited

U.S. PATENT DOCUMENTS

| | | | |
|---|---|---|---|
| 5,226,321 A * | 7/1993 | Varnham | ............ G01C 19/5684 73/504.13 |
| 6,089,090 A | 7/2000 | Namerikawa et al. | |
| 6,151,964 A | 11/2000 | Nakajima | |
| 6,192,756 B1 | 2/2001 | Kikuchi et al. | |
| 6,240,781 B1 | 6/2001 | Namerikawa et al. | |
| 6,288,474 B1 | 9/2001 | Ono et al. | |

(Continued)

FOREIGN PATENT DOCUMENTS

| | | |
|---|---|---|
| JP | 06-042971 A | 2/1994 |
| JP | 07-301536 A | 11/1995 |

(Continued)

OTHER PUBLICATIONS

Official Communication issued in corresponding Japanese Patent Application No. 2013-522928, dated Sep. 9, 2014.
Official Communication issued in International Patent Application No. PCT/JP2012/066501, dated Jul. 31, 2012.

*Primary Examiner* — Paul West
*Assistant Examiner* — Xin Zhong
(74) *Attorney, Agent, or Firm* — Keating & Bennett, LLP

(57) ABSTRACT

A vibrator in a vibrating gyroscope includes a circular annular portion, a rectangular annular portion, and joining portions. The rectangular annular portion is disposed adjacent to an outer side of the circular annular portion. The joining portions join the circular annular portion and the rectangular annular portion. The rectangular annular portion includes linear beam portions. The joining portions join the circular annular portion and the center portions of the beam portions to each other.

15 Claims, 8 Drawing Sheets

(56) References Cited

U.S. PATENT DOCUMENTS

| | | | |
|---|---|---|---|
| 2007/0001783 A1 | 1/2007 | Lutz et al. | |
| 2009/0133498 A1* | 5/2009 | Lo | G01C 19/5663 73/504.13 |
| 2010/0244632 A1* | 9/2010 | Maekawa | G01C 19/5607 310/360 |
| 2011/0296914 A1 | 12/2011 | Takahashi et al. | |
| 2011/0308315 A1 | 12/2011 | Araki et al. | |

FOREIGN PATENT DOCUMENTS

| | | |
|---|---|---|
| JP | 9-14967 A | 1/1997 |
| JP | 10-115526 A | 5/1998 |
| JP | 11-325917 A | 11/1999 |
| JP | 2000-081336 A | 3/2000 |
| JP | 2000-249554 A | 9/2000 |
| JP | 2000-337881 A | 12/2000 |
| JP | 2006-064539 A | 3/2006 |
| JP | 2007-184815 A | 7/2007 |
| JP | 2008-177933 A | 7/2008 |
| JP | 2009-300283 A | 12/2009 |
| JP | 2010-043955 A | 2/2010 |
| JP | 2010-210605 A | 9/2010 |
| JP | 2010-238856 A | 10/2010 |
| JP | 2011-027560 A | 2/2011 |
| JP | 2011-027561 A | 2/2011 |
| JP | 2011-027562 A | 2/2011 |
| WO | 2007/005132 A1 | 1/2007 |
| WO | 2011/086633 A1 | 7/2011 |

* cited by examiner

VIBRATOR AND VIBRATING GYROSCOPE

BACKGROUND OF THE INVENTION

1. Field of the Invention

The present invention relates to a vibrator that operates in a vibration mode of in-plane vibrating in a vibrating surface, and a vibrating gyroscope that detects an angular velocity applied to a vibrator around a rotation axis perpendicular to a vibrating surface.

2. Description of the Related Art

A vibrating gyroscope detecting an angular velocity includes a vibrator having a first vibration mode (drive vibration mode) of vibrating along a drive axis perpendicular to a rotation axis and a second vibration mode (detection vibration mode) of vibrating along a detection axis perpendicular to the rotation axis and the drive axis. When the vibrator vibrating in the drive vibration mode rotates around the rotation axis, a Coriolis force along the detection axis is applied to the vibrator. When the Coriolis force is applied, the vibrator vibrates in the detection vibration mode. The vibration amplitude of the detection vibration mode becomes an amplitude that corresponds to the magnitude of the angular velocity of a rotational movement, in other words, the magnitude of the Coriolis force occurring due to the angular velocity of the rotational movement. Therefore, by detecting the vibration amplitude of the detection vibration mode, it is possible to detect the angular velocity of the rotational movement.

The structure of a vibrator used for a vibrating gyroscope varies (refer to, for example, Japanese Unexamined Patent Application Publication No. 6-42971 and Japanese Unexamined Patent Application Publication No. 2000-249554). A type of vibrator is configured in an annular shape within a surface perpendicular to a rotation axis (in particular, refer to Japanese Unexamined Patent Application Publication No. 6-42971).

FIG. 1A is the plan view (X-Y plane plan view) of a vibrating gyroscope 101 including an annular vibrator of the related art. The vibrating gyroscope 101 has a rectangular plate shape, in which an aperture is provided, and includes a frame portion 102, a support beam 103, a coupling beam 104, and a vibrator 105. The frame portion 102 is a part having a rectangular frame shape and configuring the outer periphery portion of the vibrating gyroscope 101. The support beam 103 is provided in the central portion of each of four sides of the frame portion 102, and parallel to each side of the frame portion 102, and both end portions thereof in a longitudinal direction are joined to the frame portion 102. The coupling beam 104 is orthogonally joined to the center of each support beam 103. The vibrator 105 is a part having an annular shape, and the four points thereof are supported by the coupling beams 104.

FIG. 1B is a pattern diagram explaining deformation in the drive vibration mode of the vibrator 105. The vibrator 105 is driven so as to expand and contract in phases opposite to each other along each of an X-axis and a Y-axis. FIG. 1C is a pattern diagram explaining deformation in the detection vibration mode of the vibrator 105, the detection vibration mode corresponding to a state where a Coriolis force is applied to the vibrator 105. In the vibrator 105, a vibration due to driving and a vibration due to the Coriolis force occur in directions perpendicular to each other. Therefore, when the Coriolis force is applied, the vibrator 105 expands and contracts in a direction inclined from the X-axis and the Y-axis. Accordingly, in the vibrator 105, in response to the magnitude of the Coriolis force applied to the vibrator 105, the position of a node point (the node of a vibration) or an antinode point (the antinode of a vibration) turns out to change (rotate).

In this way, the position of the node point or the antinode point in the vibrator 105 changes in response to the magnitude of the Coriolis force applied to the vibrator 105, and in the vibrator 105, no point exists that continuously becomes the node point. Therefore, it is necessary for the vibrator 105 to be supported by the support beam 103 or the coupling beam 104 so that the displacement of each point is not disturbed.

In addition, usually, it is desirable that a detection sensitivity for an angular velocity is high in a vibrating gyroscope. The detection sensitivity for an angular velocity is expressed as a value proportional to the product of the maximum value of the Coriolis force applied to the vibrator and a detected voltage (hereinafter, referred to as a detection efficiency) output per 1 N (Newton) of the Coriolis force. The maximum value of the Coriolis force is expressed as the product of the mass of the vibrator, the maximum velocity of the displacement of the vibrator in the drive vibration mode, and an angular velocity applied to the vibrator. Accordingly, the detection sensitivity for the angular velocity is expressed as a value proportional to the product of the detection efficiency, the mass of the vibrator, and the maximum velocity of the displacement of the vibrator in the drive vibration mode.

The detection efficiency, the mass of the vibrator, the maximum velocity of the displacement of the vibrator in the drive vibration mode, and so forth have correlations not only with the detection sensitivity but also with the thickness of the vibrator, a width dimension, a stiffness property, a resonant mode, and the resonant frequency thereof.

In recent years, the miniaturization of a vibrating gyroscope has been strongly desired. In general, when a vibrator becomes small, the resonant frequency of the vibrator becomes high. Therefore, when a vibrating gyroscope including a small vibrator has been installed in a digital camera or the like, a difference between the resonant frequency of the vibrator and the frequency of a hand movement becomes large. Therefore, a sensitivity for the hand movement or the like becomes low in some cases.

Therefore, the vibrator is caused to have a specific structure or the vibrator is caused to vibrate in a specific vibration mode, and hence, even if the vibrator is small, it is possible to prevent the resonant frequency of the vibrator from being increased.

Furthermore, so as to improve the drift characteristic of the vibrating gyroscope, it is necessary for both of the drive vibration mode and the detection vibration mode to share a common node point.

By supporting the vibrator using the common node point, it is possible to prevent a vibration from leaking from a supporting portion supporting the vibrator or prevent a undesired vibration from propagating from outside, and it is possible to obtain a good drift characteristic.

The resonant frequency of a vibrator is defined by a vibration mode depending on the shape of the vibrator, a stiffness property, and a mass, and, in the vibration mode, the stiffness property or the mass is changed by adjusting the thickness and width dimensions of the vibrator, and hence, it is possible to change the resonant frequency. However, when the resonant frequency has been changed by adjusting the thickness and width dimensions of the vibrator, a characteristic other than the resonant frequency has also been changed, and it is difficult to improve a detection sensitivity for an angular velocity, in some cases.

In addition, in the same way as the vibrating gyroscope 101 including an annular vibrator of the related art, in the configuration where the position of the node point or the antinode point changes in response to the magnitude of the Coriolis force applied to the vibrator, no point exists that continuously becomes the node point in the vibrator. Accordingly, the vibrator turns out to be supported in a vibrating point, and the leakage of a vibration from the supporting portion supporting the vibrator or the propagation of a undesired vibration from outside occurs. In addition, the vibration of the vibrator is disturbed, the resonant frequency changes, and the detection sensitivity for the angular velocity becomes low in some cases.

SUMMARY OF THE INVENTION

Therefore, preferred embodiments of the present invention provide a vibrator having a node point whose position is fixed and capable of realizing a low resonant frequency regardless of the adjustment of thickness and width dimensions, and a vibrating gyroscope capable of detecting an angular velocity with a high sensitivity, using the vibrator.

A vibrator according to a preferred embodiment of the present invention includes a first annular portion, a second annular portion, and a joining portion. The second annular portion is disposed adjacent to an outer side of the first annular portion. The joining portion joins the first annular portion and the second annular portion to each other. The second annular portion is configured by linear beam portions being joined. The joining portion joins the first annular portion and a center portion of the beam portion to each other.

The vibrator having this configuration includes a first in-plane vibration mode and a second in-plane vibration mode. In the first in-plane vibration mode and the second in-plane vibration mode, a portion joining beam portions in the second annular portion becomes the node of a vibration (a node point). In addition, in the first in-plane vibration mode, portions in the first annular portion and the second annular portion, joined to the joining portion, become the antinodes of a vibration (antinode points). Accordingly, by supporting the vibrator using the portions joining beam portions in the second annular portion, it is possible to prevent the vibration of the vibrator from leaking through a supporting portion supporting the vibrator or prevent an undesired vibration from outside from propagating to the vibrator.

It is preferred that, in the above-mentioned vibrator, a planar shape of the first annular portion is an annular shape and a planar shape of the second annular portion is a rectangular annular shape, for example.

In this configuration, the vibrator obtains high shape symmetry in which a rotation axis serves as a symmetric axis.

It is preferred that the above-mentioned vibrator includes a cantilever beam portion that extends from a joining position with the joining portion in the first annular portion to an inner side of the first annular portion in a radial direction.

In the vibrator having this configuration, in the first in-plane vibration mode, the cantilever beam portion is displaced in a direction in which the cantilever beam portion extends. In the second in-plane vibration mode, the cantilever beam portion vibrates so as to bend within a vibrating surface in a direction perpendicular or substantially perpendicular to the direction in which the cantilever beam portion is arranged to extend. Since the vibration directions of these cantilever beam portions are perpendicular or substantially perpendicular to each other, by causing the resonant frequencies of the first and second in-plane vibration modes to approximately coincide with each other, it is possible to configure a vibrating gyroscope in which the first or second in-plane vibration mode serves as the drive mode or detection mode of the vibrating gyroscope.

It is preferred that the above-mentioned vibrator includes a weight portion. The weight portion is connected to an end portion of the cantilever beam portion. In this configuration, because of the weight portion, the mass of the vibrator increases. Accordingly, it is possible to increase a Coriolis force applied to the cantilever beam portion.

A vibrating gyroscope according to another preferred embodiment of the present invention includes the above-mentioned vibrator, a driving portion, and a detecting portion. The driving portion drives the vibrator so that the vibrator vibrates in a first in-plane vibration mode. The detecting portion detects a vibration of the vibrator in a second in-plane vibration mode, which occurs due to a Coriolis force applied to the vibrator by an angular velocity around a rotation axis perpendicular or substantially perpendicular to a main surface of the first annular portion, the vibrator vibrating in the first in-plane vibration mode. It is preferred that the second annular portion includes a plurality of corner portions and supporting portions supporting the vibrator in the corner portions are included. In this configuration, a portion joining beam portions in the second annular portion becomes the node of a vibration (a node point) in any one of the first in-plane vibration mode and the second in-plane vibration mode. Therefore, by supporting the vibrator in the portion joining beam portions in the second annular portion, it is possible to prevent a vibration from leaking from the vibrator through a supporting portion or prevent a undesired vibration from outside from propagating to the vibrator, and it is possible to enhance a detection sensitivity for an angular velocity.

It is preferred that, in the above-mentioned vibrating gyroscope, the vibrator includes a silicon substrate and the driving portion and the detecting portion include a piezoelectric body film, a ground electrode, and a driving electrode or a detection electrode. In this configuration, a configuration is adopted where the vibrator is independent from the driving portion or the detecting portion. Accordingly, it is possible to put the shape of the vibrator into a shape to cause an ideal vibration mode, and it is possible to enhance a detection sensitivity for an angular velocity. In addition, in the vibrator, it is possible to realize high shape accuracy due to semiconductor microfabrication performed on the silicon substrate. In addition, it is possible to form the piezoelectric body film or the electrode using a thin-film microfabrication process.

It is preferred that, in the above-mentioned vibrating gyroscope, the piezoelectric body film, the ground electrode, the driving electrode, and the detection electrode are provided in only one surface of the vibrator. By sequentially implementing a semiconductor microfabrication process and the thin-film microfabrication process, is possible to realize this configuration, and it is possible to simplify a manufacturing process.

It is preferred that, in the above-mentioned vibrating gyroscope, the driving portion and the detecting portion include a floating electrode and the driving electrode or the detection electrode is arranged to face the floating electrode across the piezoelectric body film. In this configuration, since it is not necessary to provide a wiring line connected to the floating electrode, it is not necessary to process the silicon substrate or the piezoelectric body film so as to provide the wiring line, and it is possible to simplify a manufacture process.

It is preferred that, in the above-mentioned vibrating gyroscope, the driving electrode includes a first driving electrode arranged so as to face the ground electrode across the piezoelectric body film, and a second driving electrode that faces the ground electrode across the piezoelectric body film and is arranged to be adjacent to the first driving electrode. In this configuration, driving voltages whose polarities are opposite to each other are applied to the first driving electrode and the second driving electrode. Therefore, it is possible to double the intensity of an electric field applied to the piezoelectric body film, compared with a case where driving voltages having a single polarity are only applied. In addition, by changing the voltage polarities of the driving voltages applied to the first driving electrode and the second driving electrode, it is possible to change the direction of an electric field applied to the piezoelectric body film. Therefore, it is possible to easily realize the same deformation as in a case where the polarization direction of the piezoelectric body film is reversed.

According to the vibrator of various preferred embodiments of the present invention, since a portion joining the beam portions in the second annular portion becomes a common node point shared by the first in-plane vibration mode and the second in-plane vibration mode, by supporting the vibrator using the joining portion, it is possible to prevent the vibration of the vibrator from leaking through the supporting portion or prevent a undesired vibration from outside from propagating to the vibrator.

In addition, according to the vibrating gyroscope of various preferred embodiments of the present invention, it is possible to realize a high detection sensitivity for an angular velocity.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

In the following description, it is assumed that the rotation axis of a vibrating gyroscope is defined as the Z-axis of an orthogonal coordinate system and directions along the individual sides of a vibrator whose planar shape is rectangular are individually defined as the X-axis direction and the Y-axis direction of the orthogonal coordinate system.

First Preferred Embodiment

Figure 1A:
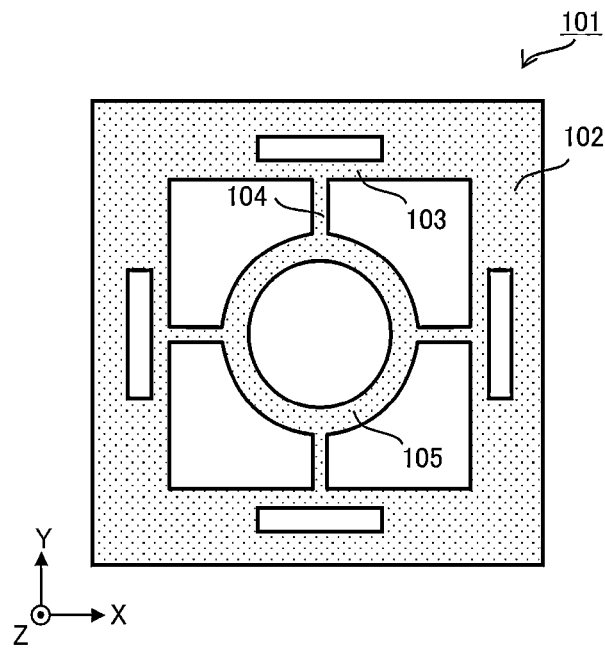
FIGS. 1A-1C are diagrams explaining a configuration of a vibrating gyroscope including a vibrator of the related art.
Figure 1B:
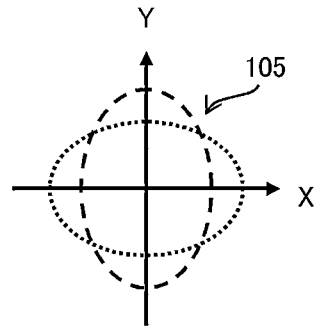
Figure 1C:
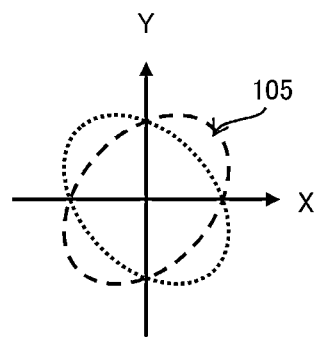
Figure 2:
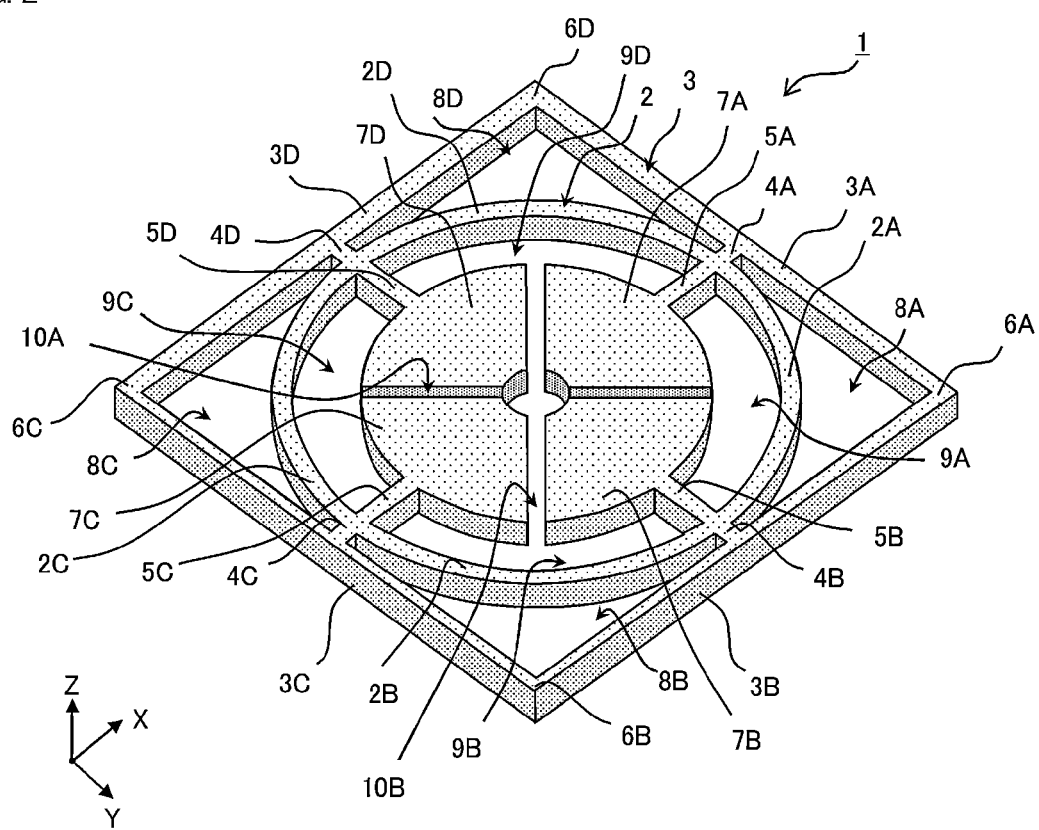
FIG. 2 is a diagram explaining a configuration of a vibrator according to a first preferred embodiment of the present invention.

FIG. 2 is the perspective view of a vibrator 1 according to a first preferred embodiment of the present invention.

The vibrator 1 includes a silicon substrate whose planar shape preferably is a square shape, and aperture portions 8A to 8D, 9A to 9D, 10A, and 10B are provided therein that penetrate in a thickness direction. The vibrator 1 includes a circular annular portion 2, a rectangular annular portion 3, joining portions 4A to 4D, cantilever beam portions 5A to 5D, and weight portions 7A to 7D, zoned by the aperture portions 8A to 8D, 9A to 9D, 10A, and 10B. The circular annular portion 2 is a first annular portion. The rectangular annular portion 3 is disposed adjacent to the outer side of the circular annular portion 2. The rectangular annular portion 3 is a second annular portion. The rectangular annular portion 3 includes corner portions 6A to 6D. Since the vibrator 1 is formed preferably using a semiconductor microfabrication technique, shape symmetry is very high with the Z-axis of the vibrator 1 serving as a symmetric axis.

The circular annular portion 2 is a portion whose planar shape is an annular shape, the outer circumference portion thereof is zoned by the aperture portions 8A to 8D, and the inner circumference portion thereof is zoned by the aperture portions 9A to 9D. In the circular annular portion 2, a region extending from a joining position with the joining portion 4A to a joining position with the joining portion 4B is a partially annular region 2A, a region extending from a joining position with the joining portion 4B to a joining position with the joining portion 4C is a partially annular region 2B, a region extending from a joining position with the joining portion 4C to a joining position with the joining portion 4D is a partially annular region 2C, and a region extending from a joining position with the joining portion 4D to a joining position with the joining portion 4A is a partially annular region 2D. The rectangular annular portion 3 is a portion whose planar shape is a rectangular annular shape, and the inner side thereof is zoned by the aperture portions 8A to 8D. The rectangular annular portion 3 includes beam portions 3A to 3D, and is configured by the beam portions 3A to 3D being joined using the corner portions 6A to 6D. Each of the beam portions 3A to 3D preferably has a linear shape, for example. The joining portions 4A to 4D are portions joining the central portion of each of the beam portions 3A to 3D and the circular annular portion 2 to each other. The cantilever beam portions 5A to 5D are portions arranged so as to extend from joining positions with the joining portions 4A to 4D in the circular annular portion 2 to the inner side of the circular annular portion 2 in a radial direction. Each of the cantilever beam portions 5A to 5D includes a fixed end serving as one end portion and a movable end serving as the other end portion. The fixed ends of the cantilever beam portions 5A to 5D are connected to the circular annular portion 2. The movable ends of the cantilever beam portions 5A to 5D are connected to the weight portions 7A to 7D. The weight portions 7A to 7D are portions whose planar shapes are sector shapes, and individually supported by the cantilever beam portions 5A to 5D. The weight portions 7A to 7D are zoned by the aperture portions 10A and 10B. The weight portions 7A to 7D are provided so that the mass of the vibrator 1 is increased and a large Coriolis force is applied.

Figure 3A:
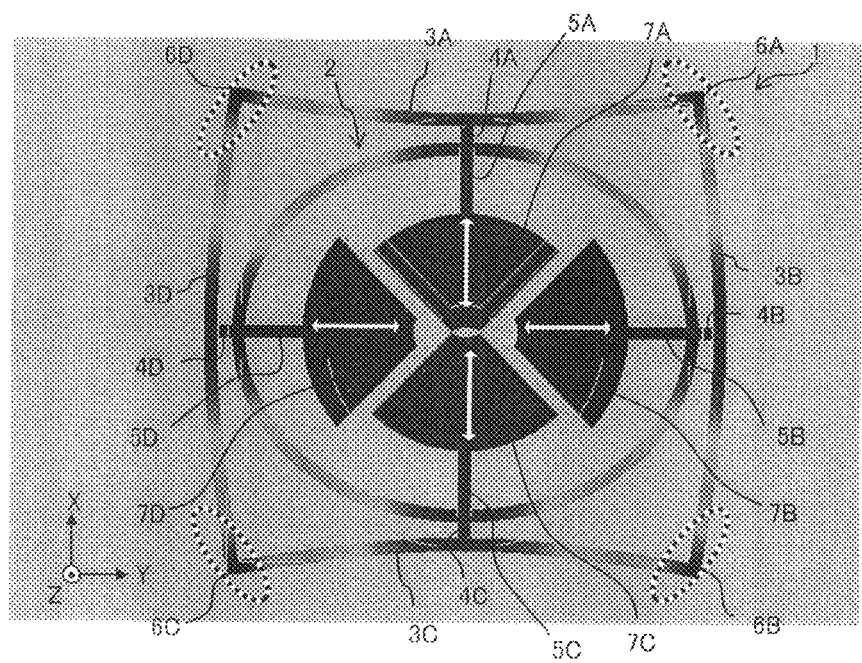
FIGS. 3A and 3B are diagrams explaining a vibration mode of the vibrator according to the first preferred embodiment of the present invention.

FIG. 3A is a diagram explaining a first in-plane vibration mode of the vibrator 1. The first in-plane vibration mode of the vibrator 1 is a vibration mode in which the vibrator 1 vibrates so as to expand and contract along the X-axis and the Y-axis, with the X-axis and the Y-axis serving as symmetric axes. In this vibration mode, portions in the circular annular portion 2 and the rectangular annular portion 3, joined to the joining portions 4A to 4D, become the antinodes of a vibration (antinode points), and vibrate in phases opposite to each other in the X-axis direction and the Y-axis direction. Specifically, the following vibration occurs. When the vibrator 1 contracts along the X-axis and expands along the Y-axis, the circular annular portion 2 contracts along the X-axis, expands along the Y-axis, and is put into an elliptical shape, the beam portion 3A and the beam portion 3C in the rectangular annular portion 3 are deformed so as to bend in a central direction, the beam portion 3B and the beam portion 3D therein are deformed so as to bend in an outward direction, the weight portion 7A and the weight portion 7C come close to each other, and the weight portion 7B and the weight portion 7D move away from each other. When the vibrator 1 expands along the X-axis and contracts along the Y-axis, the circular annular portion 2 expands along the X-axis, contracts along the Y-axis, and is put into an elliptical shape, the beam portion 3A and the beam portion 3C in the rectangular annular portion 3 are deformed so as to bend in an outward direction, the beam portion 3B and the beam portion 3D therein are deformed so as to bend in a central direction, the weight portion 7A and the weight portion 7C move away from each other, and the weight portion 7B and the weight portion 7D come close to each other. In addition, the corner portions 6A to 6D become node points of the vibrator 1. In addition, in the first in-plane vibration mode of the vibrator 1, the joining portions 4A to 4D, the cantilever beam portions 5A to 5D, and the weight portions 7A to 7D vibrates so as to reciprocate along the X-axis or the Y-axis.

Figure 3B:
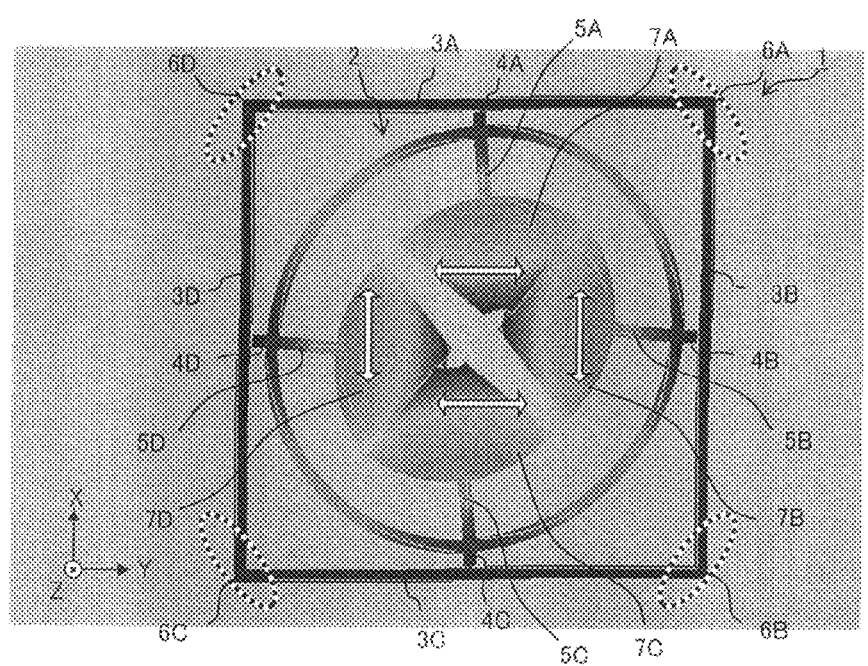

FIG. 3B is a diagram explaining a second in-plane vibration mode of the vibrator 1. The second in-plane vibration mode of the vibrator 1 is a vibration mode in which the vibrator 1 vibrates so as to expand and contract in directions inclined at ±45 degrees to the X-axis under the condition that the directions inclined at ±45 degrees to the X-axis serve as symmetric axes and the X-axis and the Y-axis serve as anti-symmetric axes. In this vibration mode, in the circular annular portion 2, portions intersecting with axes serving as the directions inclined at ±45 degrees to the X-axis become the antinodes of a vibration (antinode point). Specifically, the following vibration occurs. When the circular annular portion 2 expands along the direction inclined at +45 degrees to the X-axis, contracts in the direction inclined at −45 degrees to the X-axis, and is put into an elliptical shape, the weight portion 7A and the weight portion 7B come close to each other, and the weight portion 7C and the weight portion 7D come close to each other. When the circular annular portion 2 expands along the direction inclined at −45 degrees to the X-axis, contracts in the direction inclined at +45 degrees to the X-axis, and is put into an elliptical shape, the weight portion 7A and the weight portion 7D come close to each other, and the weight portion 7B and the weight portion 7C come close to each other. Then, the center portions of the beam portions 3A to 3D and the corner portions 6A to 6D become the node points of the vibrator 1. In addition, in the second in-plane vibration mode of the vibrator 1, the cantilever beam portions 5A to 5D and the weight portions 7A to 7D vibrate along the X-axis or the Y-axis such that portions facing each other anti-symmetrically bend.

In each of the weight portions 7A to 7D, the vibration direction in the first in-plane vibration mode and the vibration direction in the second in-plane vibration mode are out of phase with each other by 90 degrees. Accordingly, by causing the resonant frequencies of the first in-plane vibration mode and the second in-plane vibration mode to approximately coincide with each other, it is possible to utilize these vibration modes as the drive vibration mode and the detection vibration mode in the vibrating gyroscope.

In addition, in these vibration modes, the corner portions 6A to 6D in the rectangular annular portion 3 become the common node points shared by the first in-plane vibration mode and the second in-plane vibration mode. Accordingly, when the vibrator 1 is supported using the corner portions 6A to 6D serving as the node points, it is possible to prevent a vibration from leaking through a portion supporting the vibrator or prevent a undesired vibration from propagating from outside.

Figure 4A:
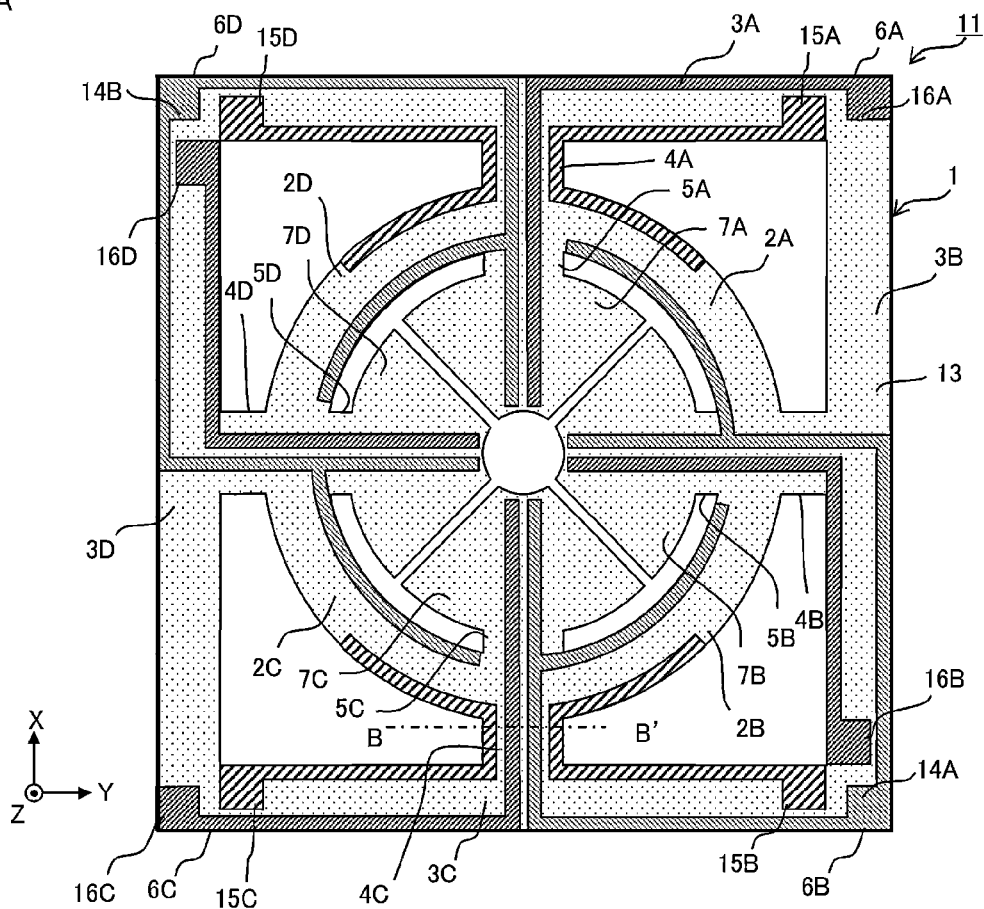
FIGS. 4A and 4B are diagrams explaining a configuration of a vibrating gyroscope according to the first preferred embodiment of the present invention.
Figure 4B:
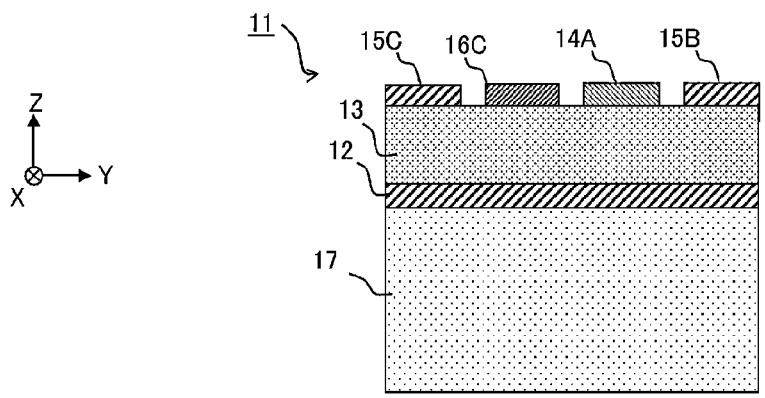

Next, an example of the configuration of a vibrating gyroscope 11 utilizing the vibrator 1 according to the first preferred embodiment of the present invention will be described. FIG. 4A is the plan view of the vibrating gyroscope 11. FIG. 4B is the partially enlarged cross-sectional view of the vibrating gyroscope 11 at a position illustrated by B-B' within FIG. 4A. In addition, here, for the sake of the description of an electrode configuration, the dimension of each portion in the vibrator 1 is changed and illustrated.

The vibrating gyroscope 11 includes a substrate 17, a floating electrode 12, a piezoelectric body film 13, ground electrodes 14A and 14B, driving electrodes 15A to 15D, and detection electrodes 16A to 16D.

The floating electrode 12 is provided in the top surface of the substrate 17. The piezoelectric body film 13 is a thin film including one of piezoelectric materials such as aluminum nitride, PZT, potassium sodium niobate, and zinc oxide, and arranged to cover the floating electrode 12 and the substrate 17. The ground electrodes 14A and 14B, the driving electrodes 15A to 15D, and the detection electrodes 16A to 16D are provided in the top surface of the piezoelectric body film 13. The substrate 17 includes a silicon substrate.

The ground electrode 14A is arranged so as to bifurcate from a pad, used for an external connection and provided in the corner portion 6B, and extend in a line shape to the beam portion 3B and the beam portion 3C, and arranged to extend through the joining portions 4B and 4C and the cantilever beam portions 5B and 5C to the leading ends of the weight portions 7B and 7C. In addition, the ground electrode 14A is arranged to bifurcate again from joining positions between the circular annular portion 2 and the cantilever beam portions 5B and 5C and extend to the partially annular regions 2A and 2B. The ground electrode 14B is arranged to bifurcate from a pad, used for an external connection and provided in the corner portion 6D, and extend in a line shape to the beam portion 3D and the beam portion 3A, and arranged to extend through the joining portions 4D and 4A and the cantilever beam portions 5D and 5A to the leading ends of the weight portions 7D and 7A. In addition, the ground electrode 14B is arranged to bifurcate again from joining positions between the circular annular portion 2 and the cantilever beam portions 5D and 5A and extend to the partially annular regions 2C and 2D.

The driving electrode 15A is arranged to extend in a line shape from a pad, used for an external connection and provided at the side of the corner portion 6A, to the beam portion 3A, and arranged to extend through the joining portion 4A to the partially annular region 2A. The driving electrode 15B is arranged to extend in a line shape from a pad, used for an external connection and provided at the side of the corner portion 6B, to the beam portion 3C, and arranged to extend through the joining portion 4C to the partially annular region 2B. The driving electrode 15C is arranged to extend in a line shape from a pad, used for an external connection and provided at the side of the corner portion 6C, to the beam portion 3C, and arranged to extend through the joining portion 4C to the partially annular region 2C. The driving electrode 15D is arranged to extend in a line shape from a pad, used for an external connection and provided at the side of the corner portion 6D, to the beam portion 3A, and arranged to extend through the joining portion 4A to the partially annular region 2D.

The detection electrode 16A is arranged to extend in a line shape from a pad, used for an external connection and provided in the corner portion 6A, to the beam portion 3A, and arranged to extend through the joining portion 4A and the cantilever beam portion 5A to the leading end of the weight portion 7A. The detection electrode 16B is arranged to extend in a line shape from a pad, used for an external connection and provided at the side of the corner portion 6B, to the beam portion 3B, and arranged to extend through the joining portion 4B and the cantilever beam portion 5B to the leading end of the weight portion 7B. The detection electrode 16C is arranged to extend in a line shape from a pad, used for an external connection and provided in the corner portion 6C, to the beam portion 3C, and arranged to extend through the joining portion 4C and the cantilever beam portion 5C to the leading end of the weight portion 7C. The detection electrode 16D is arranged to extend in a line shape from a pad, used for an external connection and provided at the side of the corner portion 6D, to the beam portion 3D, and arranged to extend through the joining portion 4D and the cantilever beam portion 5D to the leading end of the weight portion 7D.

In collaboration with the floating electrode 12, the piezoelectric body film 13, and the ground electrodes 14A and 14B, the driving electrodes 15A to 15D configure an electromechanical conversion element functioning as a driving portion. In collaboration with the floating electrode 12, the piezoelectric body film 13, and the ground electrodes 14A and 14B, the detection electrodes 16A to 16D configure an electromechanical conversion element functioning as a detecting portion.

The driving electrodes 15A to 15D are arranged to extend along the Y-axis in the partially annular regions 2A to 2D. Therefore, when an alternating voltage is applied to the driving electrodes 15A to 15D, the vibrator 1 vibrates in the first in-plane vibration mode illustrated in FIG. 3A. In other words, the vibrating gyroscope 11 utilizes the first in-plane vibration mode of the vibrator 1 as the drive vibration mode.

In the vibrating gyroscope 11, when an angular velocity around the Z-axis serving as a rotation axis is applied to the vibrator 1 in a state in which the vibrator 1 vibrates in the drive vibration mode, a Coriolis force is applied in a direction perpendicular to the rotation axis and a vibration direction in the drive vibration mode of the vibrator 1. As a result of this Coriolis force, the vibrator 1 vibrates in the second in-plane vibration mode illustrated in FIG. 3B. In other words, the vibrating gyroscope 11 utilizes the second in-plane vibration mode of the vibrator 1 as the detection vibration mode. The vibration of the detection vibration mode becomes an amplitude corresponding to a magnitude of the angular velocity applied to the vibrator 1, in other words, the magnitude of the Coriolis force occurring due to the angular velocity. Then, the cantilever beam portion 5A and cantilever beam portion 5C and the cantilever beam portion 5B and cantilever beam portion 5D individually bend in directions opposite to each other, and detected voltages individually occur in the detection electrode 16A and detection electrode 16C and the detection electrode 16B and detection electrode 16D in phases opposite to each other. When a voltage obtained by adding the detected voltages of the detection electrodes 16A and 16C and a voltage obtained by adding the detected voltages of the detection electrodes 16B and 16D are subjected to differential amplification, the detected voltages having phases opposite to each other are added. Accordingly, it is possible to configure a detection circuit so as to obtain an output corresponding to the amplitude of the vibration due to the detection vibration mode.

In addition, in the vibrating gyroscope 11, in a state where the vibrator 1 vibrates in the drive vibration mode, when acceleration is applied in a predetermined direction within the vibrating surface, an inertial force is added in the direction of the acceleration. Then, the cantilever beam portion 5A and cantilever beam portion 5C and the cantilever beam portion 5B and cantilever beam portion 5D individually bend in directions equal to each other, and detected voltages individually occur in the detection electrode 16A and detection electrode 16C and the detection electrode 16B and detection electrode 16D in phases equal to each other. When a voltage obtained by adding the detected voltages of the detection electrodes 16A and 16C and a voltage obtained by adding the detected voltages of the detection electrodes 16B and 16D are subjected to differential amplification, the detected voltages having phases equal to each other cancel each other out. Accordingly, it is possible to configure a detection circuit so as not to detect an output due to this acceleration.

In such a way as described above, the vibrating gyroscope 11 of the present preferred embodiment is provided. Since, in the vibrating gyroscope 11, the corner portions 6A to 6D become the node points in any vibration mode of the drive vibration mode and the detection vibration mode, it is possible to prevent a vibration from leaking through a supporting portion in the vibrator 1 or prevent a undesired vibration from propagating from outside, by supporting the vibrator 1 in the corner portions 6A to 6D serving as the node points. Therefore, the drift of the detected voltage is prevented, and it is possible to improve the detection sensitivity for the angular velocity.

In addition, the vibrator 1 preferably has a configuration that is integrally defined by the silicon substrate, and an electromechanical conversion element is defined by the piezoelectric body film 13 and the electrodes 12, 14A, 14B, 15A to 15D, and 16A to 16D. Therefore, it is possible to manufacture the vibrating gyroscope 11 using a semiconductor microfabrication process for a vibrator and a thin-film microfabrication process for an electrode and a piezoelectric body film. Accordingly, it is possible to make shape accuracy very high. In addition, by providing the floating electrode 12 between the piezoelectric body film 13 and the substrate 17, it is possible to cause an electric field applied to the piezoelectric body film 13 to be vertical, and it is possible to enlarge the deformation of the piezoelectric body film 13. In addition, it is not necessary to wire the floating electrode 12 by providing a via hole or the like in the vibrator 1, and it is possible to vibrate the vibrator 1 in an ideal vibration mode.

Second Preferred Embodiment

Next, a vibrating gyroscope 21 according to a second preferred embodiment of the present invention will be described.

Figure 5:
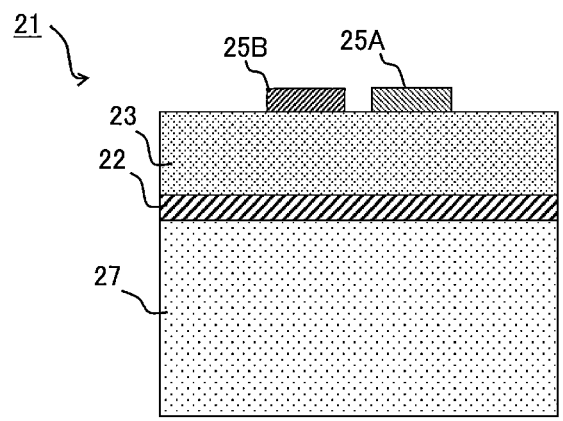
FIG. 5 is a diagram explaining a configuration of a vibrating gyroscope according to a second preferred embodiment of the present invention.

FIG. 5 is the partially enlarged cross-sectional view of the vibrating gyroscope 21. The vibrating gyroscope 21 has a configuration including an electrode structure different from the vibrating gyroscope 11 according to the first preferred embodiment.

The vibrating gyroscope 21 includes a ground electrode 22, a piezoelectric body film 23, a first driving electrode 25A, a second driving electrode 25B, and a substrate 27. The ground electrode 22 is disposed between the piezoelectric body film 23 and the substrate 27. The ground electrode 22 is obtained by connecting the floating electrode 12 of the first preferred embodiment to a ground. The first driving electrode 25A and the second driving electrode 25B are arranged to face the ground electrode 22 across the piezoelectric body film 23. With such an electrode structure, driving voltages whose phases are opposite to each other are applied to the first driving electrode 25A and the second driving electrode 25B. Therefore, even in the case of the same driving voltages as in the electrode structure illustrated in the first preferred embodiment, it is possible to double the intensity of an electric field applied to the piezoelectric body film 23, and it is possible to further enlarge the vibration amplitude of the vibrator 1.

Third Preferred Embodiment

Figure 6A:
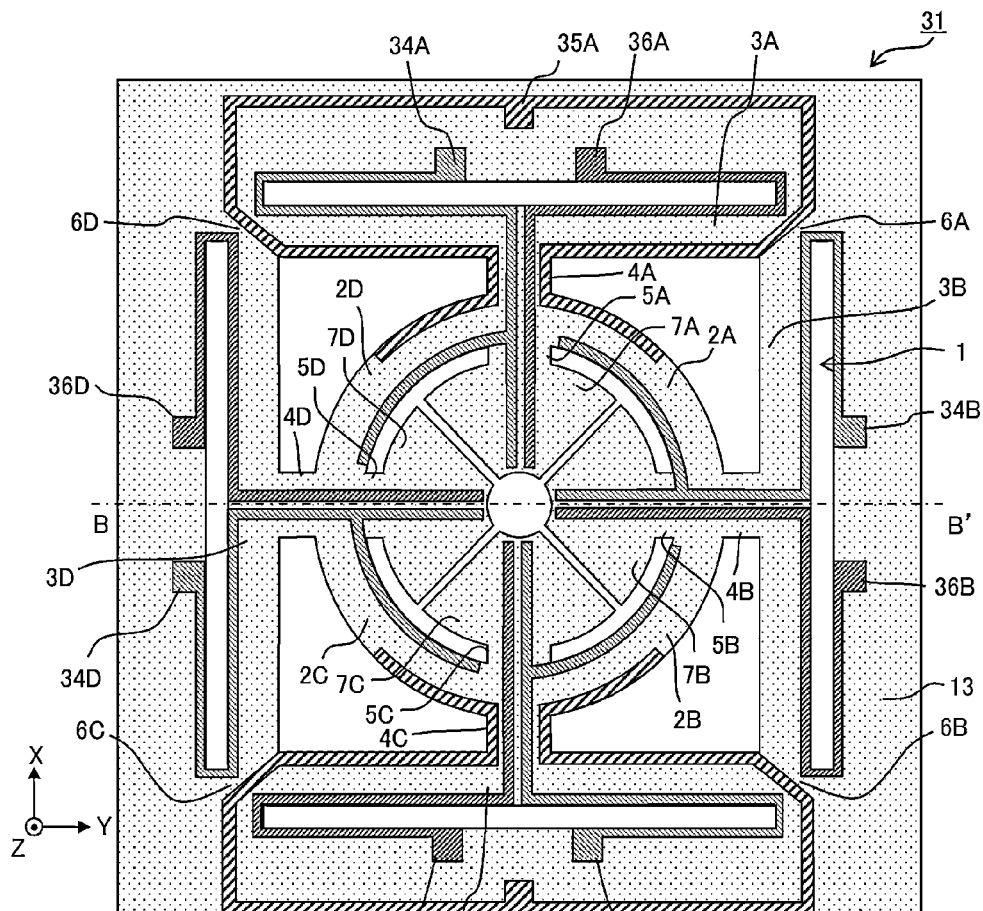
FIGS. 6A-6C are diagrams explaining a configuration of a vibrating gyroscope according to a third preferred embodiment of the present invention.
Figure 6B:
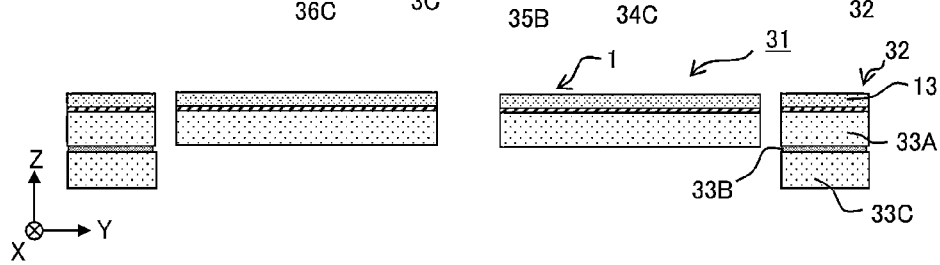

Next, a vibrating gyroscope 31 according to a third preferred embodiment of the present invention will be described. FIG. 6A is the plan view of the vibrating gyroscope 31. FIG. 6B is the cross-sectional view of the vibrating gyroscope 31 at a position illustrated by B-B' within FIG. 6A.

In the outer side of the vibrator 1, the vibrating gyroscope 31 includes a support frame 32 supporting the corner portions 6A to 6D in the vibrator 1 illustrated in the first preferred embodiment. The support frame 32 is a supporting portion. The support frame 32 includes an upper frame portion 33A, an $SiO_2$ film 33B, and a lower frame portion 33C. The upper frame portion 33A is arranged to be integrated with the vibrator 1. The $SiO_2$ film 33B is provided in the bottom surface of the upper frame portion 33A. The lower frame portion 33C includes a silicon substrate having a rectangular frame shape, and is provided in the bottom surface of the $SiO_2$ film 33B. In addition, the vibrating gyroscope 31 includes ground electrodes 34A to 34D, driving electrodes 35A and 35B, and detection electrodes 36A to 36D. The ground electrodes 34B and 34C are provided in place of the ground electrode 14A illustrated in the first preferred embodiment. The ground electrodes 34A and 34D are provided in place of the ground electrode 14B illustrated in the first preferred embodiment. The driving electrode 35A is provided in place of the driving electrodes 15A and 15D illustrated in the first preferred embodiment. The driving electrode 35B is provided in place of the driving electrodes 15B and 15C illustrated in the first preferred embodiment. The detection electrodes 36A to 36D are provided in place of the detection electrodes 16A to 16D illustrated in the first preferred embodiment. The external-connection pads of the ground electrodes 34A to 34D, the driving electrodes 35A and 35B, and the detection electrodes 36A to 36D are provided in the support frame 32.

In the case of such a configuration, by providing, in the support frame 32, the external-connection pads of the ground electrodes 34A to 34D, the driving electrodes 35A and 35B, and the detection electrodes 36A to 36D, wiring due to wire bonding or the like becomes easy. In addition, the external-connection pads are provided in the support frame 32 not vibrating, and hence, it is possible to prevent the vibration of the vibrator 1 from being disturbed by a bonding wire or prevent a vibration from leaking through the bonding wire. In addition, it is possible to manufacture the vibrating gyroscope 31 using a SOI (Silicon On Insulator) substrate. The SOI substrate is a substrate in which the single crystal structure of silicon in provided in both surfaces of the $SiO_2$ film.

When the SOI substrate is used in the vibrating gyroscope 31, it is desirable that the vibrator 1 and the upper frame portion 33A are formed by performing, from the upper surface side of the SOI substrate, etching where the $SiO_2$ film is an etching stop layer and the lower frame portion 33C is formed by performing, from the bottom surface side of the SOI substrate, etching where the $SiO_2$ film is an etching stop layer, for example. By manufacturing the vibrating gyroscope 31 using the SOI substrate in this way, it is possible to achieve the stability of the supply of members, qualitative improvement, the reduction of a manufacturing cost, and so forth.

Figure 6C:
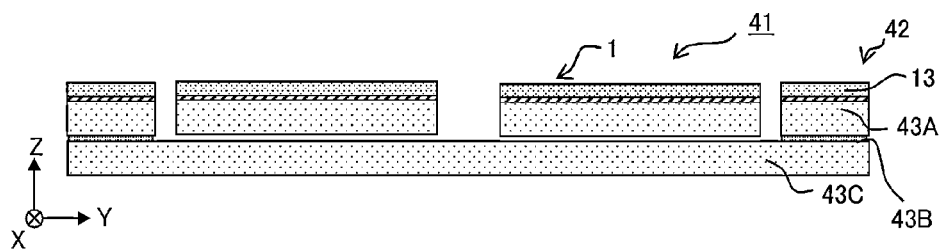

FIG. 6C is the partially enlarged cross-sectional view of a vibrating gyroscope 41 according to an example of a modification to the present preferred embodiment. The vibrating gyroscope 41 includes a support frame 42. The support frame 42 includes an upper frame portion 43A, an $SiO_2$ film 43B, and a lower frame portion 43C. The upper frame portion 43A is arranged to be integrated with the vibrator 1. The $SiO_2$ film 43B is provided in the bottom surface of the upper frame portion 43A. The lower frame portion 43C includes a silicon substrate having a rectangular shape, and is provided in the bottom surface of the $SiO_2$ film 43B.

In the case of such a configuration, it is also possible to manufacture the vibrating gyroscope 41 using the SOI substrate. Specifically, it is desirable that the vibrator 1 and the upper frame portion 43A are formed by performing, from the upper surface side of the SOI substrate, etching where the $SiO_2$ film is an etching stop layer and the $SiO_2$ film 43B is pattern-formed by etching the $SiO_2$ film from an aperture portion due to that etching. In this case, by manufacturing the vibrating gyroscope 41 using the SOI substrate, it is also possible to achieve the stability of the supply of members, qualitative improvement, the reduction of a manufacturing cost, and so forth.

Fourth Preferred Embodiment

Figure 7A:
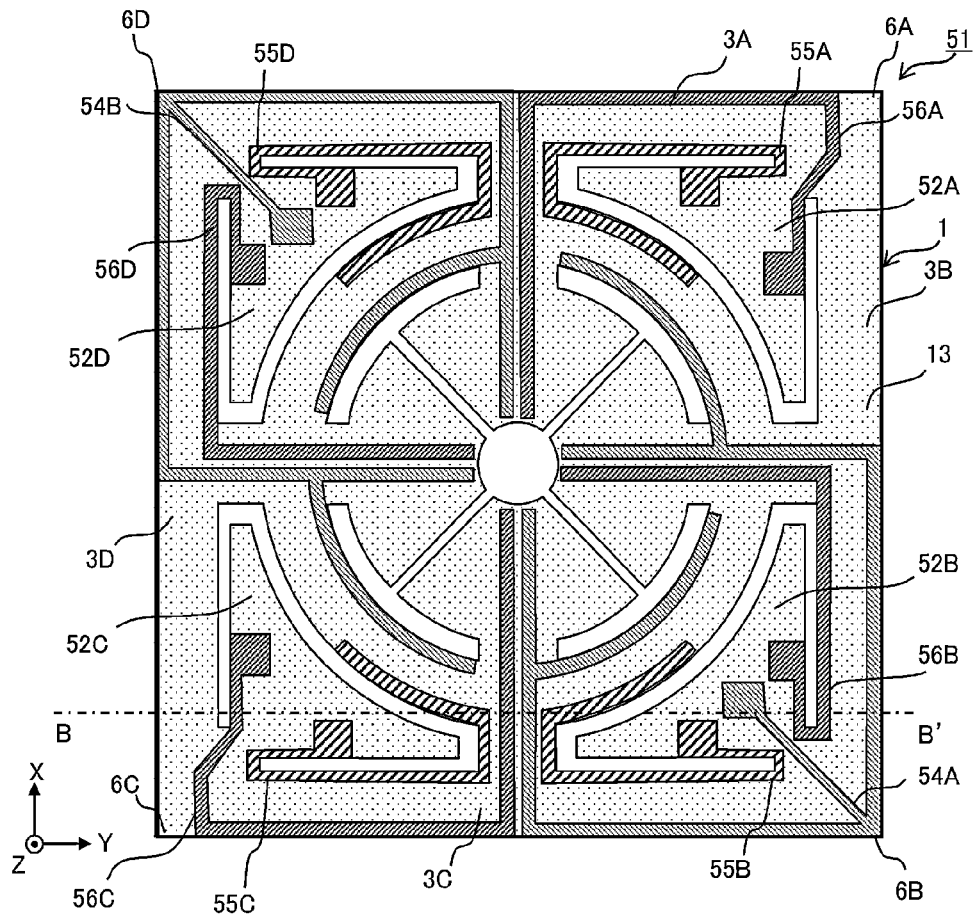
FIGS. 7A-7C are diagrams explaining a configuration of a vibrating gyroscope according to a fourth preferred embodiment of the present invention.
Figure 7B:
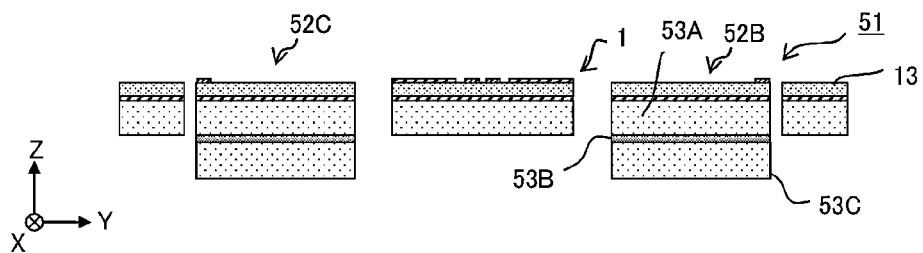

Next, a vibrating gyroscope 51 according to a fourth preferred embodiment of the present invention will be described. FIG. 7A is the plan view of the vibrating gyroscope 51. FIG. 7B is the partially enlarged cross-sectional view of the vibrating gyroscope 51 at a position illustrated by B-B' within FIG. 7A.

In the inner side of the aperture portions 8A to 8D (the symbols thereof are not illustrated) illustrated in the first preferred embodiment, the vibrating gyroscope 51 includes support struts 52A to 52D supporting the corner portions 6A to 6D of the vibrator 1. The support struts 52A to 52D are supporting portions. The support struts 52A to 52D include upper strut portions 53A, $SiO_2$ films 53B, and lower strut portions 53C. The upper strut portion 53A is arranged to be integrated with the vibrator 1. The $SiO_2$ film 53B is provided in the bottom surface of the upper strut portion 53A. The lower strut portion 53C includes a silicon substrate, and is provided in the bottom surface of the $SiO_2$ film 53B. In addition, the vibrating gyroscope 51 includes ground electrodes 54A and 54B, driving electrodes 55A to 55D, and detection electrodes 56A to 56D. The ground electrodes 54A and 54B are provided in place of the ground electrodes 14A and 14B illustrated in the first preferred embodiment. The driving electrodes 55A to 55D are provided in place of the driving electrodes 15A to 15D illustrated in the first preferred embodiment. The detection electrodes 56A to 56D are provided in place of the detection electrodes 16A to 16D illustrated in the first preferred embodiment. Except for the above-mentioned points, the vibrating gyroscope 51 has the same configuration as the vibrating gyroscope 11 illustrated in the first preferred embodiment. The external-connection pads of the ground electrodes 54A and 54B, the driving electrodes 55A to 55D, and the detection electrodes 56A to 56D are provided in the support struts 52A to 52D.

In the case of such a configuration, since the support struts 52A to 52D supporting the corner portions 6A to 6D of the vibrator 1 are provided in the aperture portions 8A to 8D (the symbols thereof are not illustrated) located between the rectangular annular portion 3 and the circular annular portion 2, it is possible to configure the vibrating gyroscope 51 in a considerably small size. In addition, by providing, in the support struts 52A to 52D, the external-connection pads of the ground electrodes 54A and 54B, the driving electrodes 55A to 55D, and the detection electrodes 56A to 56D, wiring due to wire bonding or the like becomes easy. In addition, the external-connection pads are provided in the support struts 52A to 52D not vibrating, and hence, it is possible to prevent the vibration of the vibrator 1 from being disturbed by a bonding wire or prevent a vibration from leaking through the bonding wire. In addition, it is possible to manufacture the vibrating gyroscope 51 using the SOI (Silicon On Insulator) substrate. Specifically, it is desirable that the vibrator 1 and the upper strut portion 53A are formed by performing, from the upper surface side of the SOI substrate, etching where the $SiO_2$ film is an etching stop layer and the lower strut portion 53C is formed by performing, from the bottom surface side of the SOI substrate, etching where the $SiO_2$ film is an etching stop layer. By manufacturing the vibrating gyroscope 51 using the SOI substrate in this way, it is possible to achieve the stability of the supply of members, qualitative improvement, the reduction of a manufacturing cost, and so forth.

Figure 7C:
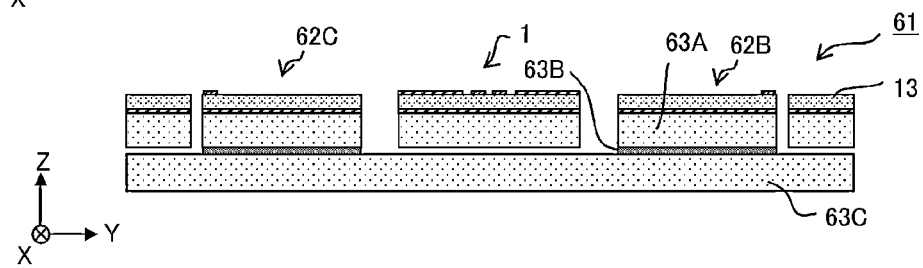

FIG. 7C is the partially enlarged cross-sectional view of a vibrating gyroscope 61 according to an example of a modification to the present preferred embodiment. The vibrating gyroscope 61 includes support struts 62A to 62D. The support struts 62A to 62D include upper strut portions 63A, $SiO_2$ films 63B, and lower portions 63C. The upper strut portion 63A is arranged to be integrated with the vibrator 1. The $SiO_2$ film 63B is provided in the bottom surface of the upper strut portion 63A. The lower portion 63C includes a silicon substrate, and is provided in the bottom surface of the $SiO_2$ film 63B.

In the case of such a configuration, it is also possible to manufacture the vibrating gyroscope 61 using the SOI substrate. Specifically, it is desirable that the vibrator 1 and the upper strut portion 63A are preferably formed by performing, from the upper surface side of the SOI substrate, etching where the $SiO_2$ film is an etching stop layer and the $SiO_2$ film 63B is pattern-formed by etching the $SiO_2$ film from an aperture portion due to that etching, for example. In this case, by manufacturing the vibrating gyroscope 61 using the SOI substrate, it is also possible to achieve the stability of the supply of members, qualitative improvement, the reduction of a manufacturing cost, and so forth.

Fifth Preferred Embodiment

Figure 8:
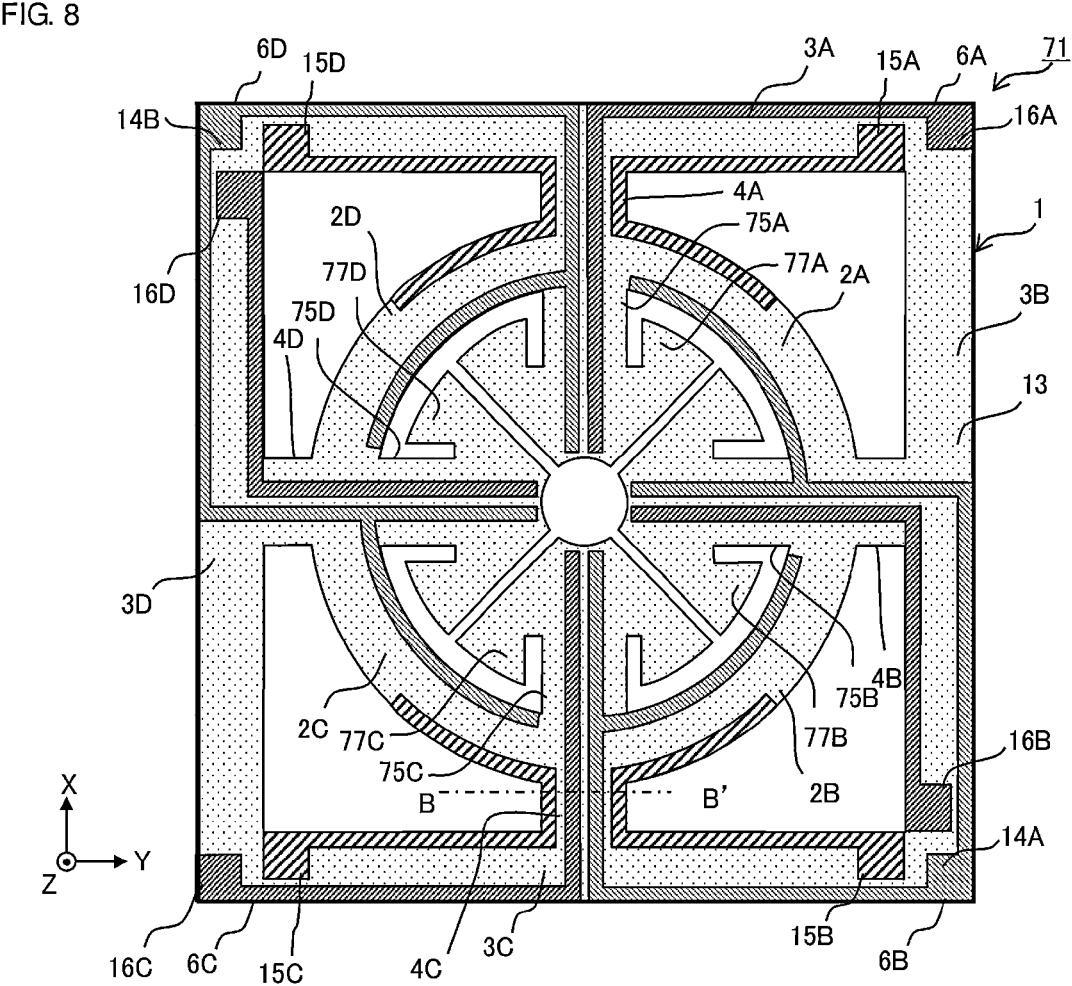
FIG. 8 is a diagram explaining a configuration of a vibrating gyroscope according to a fifth preferred embodiment of the present invention.

Next, a vibrating gyroscope 71 according to a fifth preferred embodiment of the present invention will be described. FIG. 8 is the plan view of the vibrating gyroscope 71.

The vibrating gyroscope 71 includes cantilever beam portions 75A to 75D and weight portions 77A to 77D. The cantilever beam portions 75A to 75D are provided in place of the cantilever beam portions 5A to 5D illustrated in the first preferred embodiment. The weight portions 77A to 77D are provided in place of the weight portions 7A to 7D illustrated in the first preferred embodiment. In joining portions between the cantilever beam portions 75A to 75D and the weight portions 77A to 77D, slits are provided along the cantilever beam portions 75A to 75D. Accordingly, the cantilever beam portions 75A to 75D are lengthened. Accordingly, the resonant frequency of the second in-plane vibration mode of the vibrator 1 is further lowered. In such a configuration, by adjusting the lengths of the slits provided in the joining portions between the cantilever beam portions 75A to 75D and the weight portions 77A to 77D, it is possible to adjust the resonant frequency of the second in-plane vibration mode of the vibrator 1, and it is possible to adjust a frequency difference between the resonant frequency of the first in-plane vibration mode and the resonant frequency of the second in-plane vibration mode.

While the present invention is implemented in such a way as illustrated in each of the above-mentioned preferred embodiments, the scope of the present invention is not limited to the preferred embodiments, and it is intended to include any modifications insofar as they are within the scope of the appended claims or the equivalents thereof.

For example, the driving portion or the detecting portion is not limited to an electromechanical conversion element utilizing a piezoelectric body film, and is also configured as an element utilizing another principle, such as an electrostatic capacity. In addition, while here the vibrator and the electromechanical conversion element preferably may have configurations independent from each other, both of the two may also be integrally configured. The material of each portion, a manufacturing method therefor, or the shape thereof is not limited to the above-mentioned, and the circular annular portion or the rectangular annular portion may also be put into a polygonal annular shape, or the driving portion and the detecting portion may also be disposed in the different main surfaces of the vibrator.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vibrator comprising:
a circular annular portion;
a rectangular annular portion located adjacent to an outer side of the circular annular portion;
joining portions arranged to join the circular annular portion and the rectangular annular portion to each other;
cantilever beam portions that extend from joining positions at which the joining portions are connected to the circular annular portion towards an inner side of the circular annular portion in a radial direction; and
weight portions having planar sector shapes that are zoned by aperture portions; wherein the rectangular annular portion includes beam portions joined to each other;

the joining portions join the circular annular portion and a center portion of the beam portions to each other;

the aperture portions include portions that divide the weight portions, are defined by parallel or substantially parallel adjacent surfaces of the weight portions that face each other, and are parallel or substantially parallel to diagonal lines that connect corners of the rectangular annular portion; and the weight portions are connected to end portions of the cantilever beam portions.

2. The vibrator according to claim 1, wherein slits are provided in a joining portion between the cantilever beam portions and the weight portions along the cantilever beam portions.

3. The vibrator according to claim 1, wherein the beam portions of the rectangular annular portion are linear beam portions.

4. A vibrating gyroscope comprising:

the vibrator according to claim 1;

a driving portion arranged to drive the vibrator so that the vibrator vibrates in a first in-plane vibration mode; and a detecting portion configured to detect a vibration of the vibrator in a second in-plane vibration mode, which occurs due to a Coriolis force applied to the vibrator by an angular velocity around a rotation axis perpendicular or substantially perpendicular to a main surface of the circular annular portion, the vibrator vibrating in the first in-plane vibration mode.

5. The vibrating gyroscope according to claim 4, wherein the rectangular annular portion includes a plurality of corner portions; and supporting portions supporting the vibrator in the corner portions are included.

6. The vibrating gyroscope according to claim 4, wherein the vibrator includes a silicon substrate; and the driving portion and the detecting portion include a piezoelectric body film, a ground electrode, and a driving electrode or a detection electrode.

7. The vibrating gyroscope according to claim 6, wherein the piezoelectric body film, the ground electrode, the driving electrode, and the detection electrode are provided on only one surface of the vibrator.

8. The vibrating gyroscope according to claim 7, wherein the driving portion and the detecting portion include a floating electrode; and the driving electrode or the detection electrode is arranged to face the floating electrode across the piezoelectric body film.

9. The vibrating gyroscope according to claim 7, wherein the driving electrode includes a first driving electrode arranged to face the ground electrode across the piezoelectric body film, and a second driving electrode that faces the ground electrode across the piezoelectric body film and is adjacent to the first driving electrode.

10. The vibrating gyroscope according to claim 7, further comprising an upper frame portion that is integral with the vibrator, an $SiO_2$ film provided in a bottom surface of the upper frame portion, and a lower frame portion including a silicon substrate having a rectangular frame shape and provided in a bottom surface of the $SiO_2$ film.

11. The vibrating gyroscope according to claim 4, further comprising a plurality of ground electrodes, a plurality of driving electrodes, and a plurality of detection electrodes.

12. The vibrating gyroscope according to claim 4, further comprising a plurality of support struts arranged to support corner portions of the vibrator.

13. The vibrating gyroscope according to claim 12, wherein the support struts include upper strut portions that are integral with the vibrator, $SiO_2$ films provided in a bottom surface of the upper strut portions, and lower strut portions including a silicon substrate and provided in a bottom surface of the $SiO_2$ film.

14. The vibrating gyroscope according to claim 13, further comprising a plurality of ground electrodes, a plurality of driving electrodes, and a plurality of detection electrodes.

15. The vibrating gyroscope according to claim 4, wherein the at least one of the driving portion and the detecting portion is an electromechanical conversion element or an electrostatic capacity element.

* * * * *